United States Patent
Newman

(10) Patent No.: US 12,189,040 B2
(45) Date of Patent: Jan. 7, 2025

(54) INTELLIGRIP, BICYCLE HANDLEBAR APPARATUS AND RELATED COMPUTER-IMPLEMENTED METHODS

(71) Applicant: Samuel Benjamin Newman, Bend, OR (US)

(72) Inventor: Samuel Benjamin Newman, Bend, OR (US)

(73) Assignee: Samuel Benjamin Newman, Bend, OR (US)

( * ) Notice: Subject to any disclaimer, the term of this patent is extended or adjusted under 35 U.S.C. 154(b) by 327 days.

(21) Appl. No.: 17/847,383

(22) Filed: Jun. 23, 2022

(65) Prior Publication Data

US 2023/0417923 A1 Dec. 28, 2023

(51) Int. Cl.

| | |
|---|---|
| G01S 19/01 | (2010.01) |
| B62H 5/20 | (2006.01) |
| B62J 3/10 | (2020.01) |
| B62J 45/414 | (2020.01) |
| B62J 45/416 | (2020.01) |
| B62J 50/22 | (2020.01) |
| B62K 21/26 | (2006.01) |
| G06Q 30/018 | (2023.01) |
| B62J 6/00 | (2020.01) |
| G06Q 40/08 | (2012.01) |

(52) U.S. Cl.
CPC ............ *G01S 19/01* (2013.01); *B62H 5/20* (2013.01); *B62J 3/10* (2020.02); *B62J 45/414* (2020.02); *B62J 45/416* (2020.02); *B62J 50/22* (2020.02); *B62K 21/26* (2013.01); *G06Q 30/018* (2013.01); *B62J 6/00* (2013.01); *G06Q 40/08* (2013.01)

(58) Field of Classification Search
CPC ........ G01S 19/01; G06Q 30/018; B62J 50/22; B62J 45/414; B62J 3/10; B62J 45/416; B62H 5/20
USPC ...................................................... 342/357.39
See application file for complete search history.

(56) References Cited

U.S. PATENT DOCUMENTS

| | | | | |
|---|---|---|---|---|
| 2023/0064633 A1* | 3/2023 | Pienaar | .................. | G06F 3/167 |
| 2023/0417923 A1* | 12/2023 | Newman | ............... | B62J 45/416 |

FOREIGN PATENT DOCUMENTS

| | | | | | |
|---|---|---|---|---|---|
| CN | 212950918 U | * | 4/2021 | | |
| CN | 113359564 A | * | 9/2021 | | |
| CN | 114598988 A | * | 6/2022 | ............. | G01S 19/10 |
| WO | WO-2017003074 A1 | * | 1/2017 | ............. | B62J 6/001 |

* cited by examiner

*Primary Examiner* — Harry K Liu
(74) *Attorney, Agent, or Firm* — Alexander Rowley

(57) ABSTRACT

The present disclosure provides an apparatus configured to couple to a bicycle and act as a handlebar grip. The apparatus is equipped with a GPS unit, a controller, and a wireless communications module for communicating with a user device such as a smartphone. The positioning data of the apparatus, and thus of a bicycle to which it is affixed, is tracked and recorded, and can be used to calculate various useful metrics. The GPS functionality also allows for increased security and theft prevention features.

17 Claims, 3 Drawing Sheets

INTELLIGRIP, BICYCLE HANDLEBAR APPARATUS AND RELATED COMPUTER-IMPLEMENTED METHODS

FIELD OF INVENTION

The present invention relates generally to bicycle accessories. More specifically, the present invention relates to a handlebar apparatus to be installed on a bicycle to track the movements of the connected bicycle.

BACKGROUND

Awareness of the global climate crisis and the damage done by fossil fuels is greater now than it has ever been. One way in which people are attempting to counteract this is by reducing their use of automotive vehicles and relying on bicycles for short to medium distance journeys. However, there are risks and problems associated with bicycle use that deter users from doing so.

Firstly, bicycles are often highly valuable items, and are difficult to protect from theft due to their lightweight nature. Despite much innovation in bicycle locks etc., they are still one of the most commonly stolen items in the world. Some attempts have been made to solve this problem by affixing units with trackers to the bicycles, for example IOS Airtags. While these solutions do assist with locating stolen bicycles, they are not enough legal basis for a search warrant, meaning the authorities cannot assist theft victims despite knowing the location of their bike.

Another issue slowing the shift towards cycling is the general lack of incentives to do so, given that bike riding is slower, higher effort, and more dangerous than travelling in a car. There is no service in existence that tracks the distance cycled by a user and provides proportional rewards to the cycler for the amount of carbon emissions they are saving. At present, a metric ton of $CO_2$ on the open market sells for approximately $3 dollars. According to the EPA, the average passenger vehicle emits roughly 411 grams of $CO_2$ per mile. Given the amount of travel a user can avoid by cycling, significant rewards could be built up over time if a user's cycle distance were tracked.

Another incentive that could encourage more users to cycle is if their cycling activity were tracked and used to calculate an accurate health risk profile, verified by technology. Such health risk profiles could evidence the proven benefits of cycling on users' health and assist them in obtaining lower cost health insurance, for example.

It is within this context that the present invention is provided.

SUMMARY

The present disclosure provides an apparatus configured to couple to a bicycle and act as a handlebar grip. The apparatus is equipped with a GPS unit, a controller, and a wireless communications module for communicating with a user device such as a smartphone. The positioning data of the apparatus, and thus of a bicycle to which it is affixed, is tracked and recorded, and can be used to calculate various useful metrics. The GPS functionality also allows for increased security and theft prevention features.

Thus, according to one aspect of the present disclosure there is provided a bicycle handlebar apparatus, comprising: a housing configured to couple to a bicycle handlebar; a power source disposed within the housing; a GPS unit disposed within the housing; a wireless communication module disposed within the housing.

The apparatus further comprises a controller disposed within the housing, the controller being configured to: receive positioning data from the GPS unit indicative of the geographic location and movements of the apparatus; and transmit the positioning data to an external user device via the wireless communication module in real time.

In some embodiments, the apparatus further comprises a front light element disposed on the housing exterior and/or a rear light element disposed on the housing exterior.

In some embodiments, the apparatus further comprises a speaker disposed within the housing. The controller may be further configured to sound the speaker alarm in response to one or more predefined alarm conditions.

In some embodiments, the apparatus further comprises a grip sensor disposed on the housing exterior and which is configured to measure the heartbeat of a user gripping the apparatus.

In some embodiments, the apparatus further comprises one or more physical controls for operating the controller functions.

In some embodiments, the controller is configured to interface with and receive instructions from a dedicated application software of a user device.

The dedicated application software may be configured to issue a security alert notification to the user device when one or more predefined security conditions are met. It may also provide a map interface for viewing the position of the apparatus in real time.

In many examples, the dedicated application software is configured to calculate and track, based on the received positioning data, one or more of: position history, average travel speed, distance travelled in a given period, elevation, and incline of travel for the apparatus.

The software may thus be further configured to calculate a number of carbon credits or other currency units based on positioning data. It may provide an interface for selecting an automotive vehicle owned by a user from a list, and wherein the calculation of the number of carbon credits or other currency units is based on the amount of carbon emissions saved by travelling in a bicycle as opposed to the user's automotive vehicle.

The software may also determine a health risk profile of a user based on their positioning data history for insurance purposes.

The dedicated application software may be configured to record all positioning data in a database, each set of positioning data being associated with a user account in the database.

The dedicated application software may be configured to provide an interface for a user to record their bicycle type and serial number. The software may in some cases further configured to validate the bicycle data by analysing a picture, and to store the validated data on a blockchain. The software may also be further configured to provide an interface where users having bicycles of the same type may connect and interact via social media.

In some embodiments, the apparatus further comprises an accelerometer disposed within the housing. The controller may also be further configured to detect, based on the positioning data and the accelerometer readings, whether the apparatus is attached to a bicycle being ridden by a user.

BRIEF DESCRIPTION OF THE DRAWINGS

Various embodiments of the invention are disclosed in the following detailed description and accompanying drawings.

Figure 1:
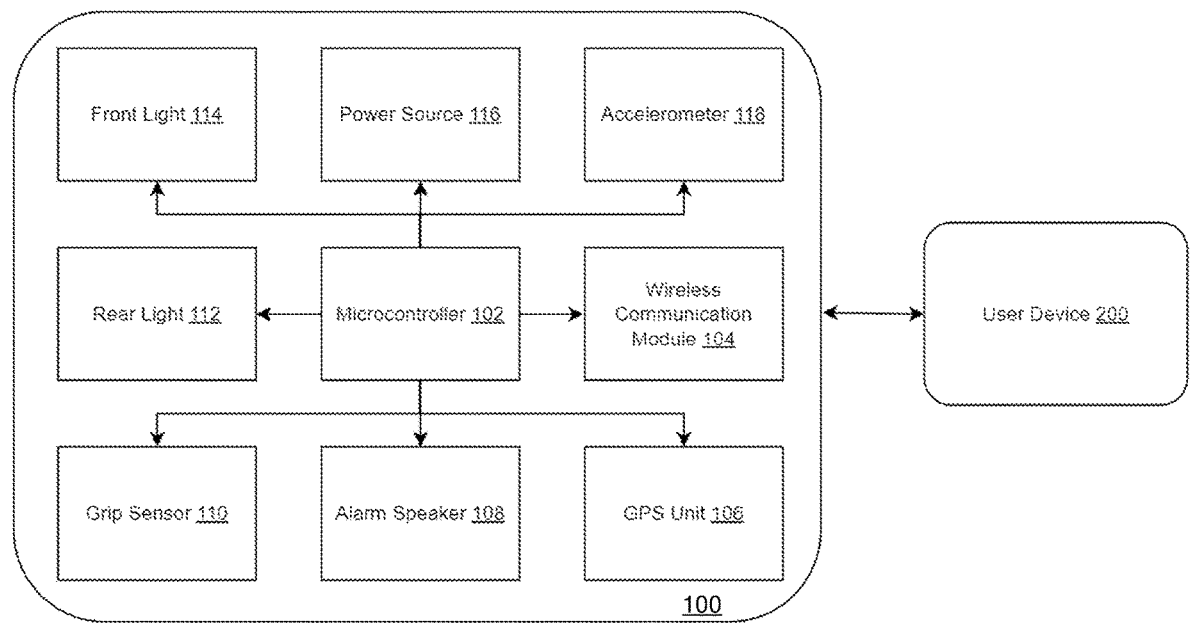
FIG. 1 illustrates a functional block diagram of the components of an example handlebar apparatus according to the present disclosure, which is in communication with an external user device.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Referring to FIG. 1, a block diagram of an example handlebar apparatus 100 is shown in communication with an external user device 200.

The various internal components of the example apparatus 100 are installed within a housing for protection. The components of the present example include a microcontroller 102 which is responsible for controlling the operation of the other components. Although not illustrated, the apparatus may also comprise one or more physical controls such as buttons or switches for operating the components.

The components also include a wireless communication module 104 for interface with external devices, this module may have both short-range communication standards such as Bluetooth, Bluetooth LE, and Wi-Fi, as well as various longer range mechanisms such as radio and satellite.

The apparatus also includes a GPS unit 106 for tracking geographic position of the apparatus, a speaker 108 for emitting audible alarms to deter theft, a grip sensor 110 for detecting a user's heartbeat and/or skin temperature. As the speaker 108 is disposed within the housing it is not visible by thieves, and they will be unaware of it until activated.

The apparatus may also include a rear light 112 and a front light 114. These may shine out of holes in the housing both in front of and behind the user. Not only does this assist with the user navigating in the dark, but the controller 102 may have a record of when the lights are activated, thus providing possible legal evidence of safe cycling if the user happens to be in a night accident.

All of the electrical components may be powered by a power source 116 such as, for example, a pair of rechargeable batteries.

Figure 2:
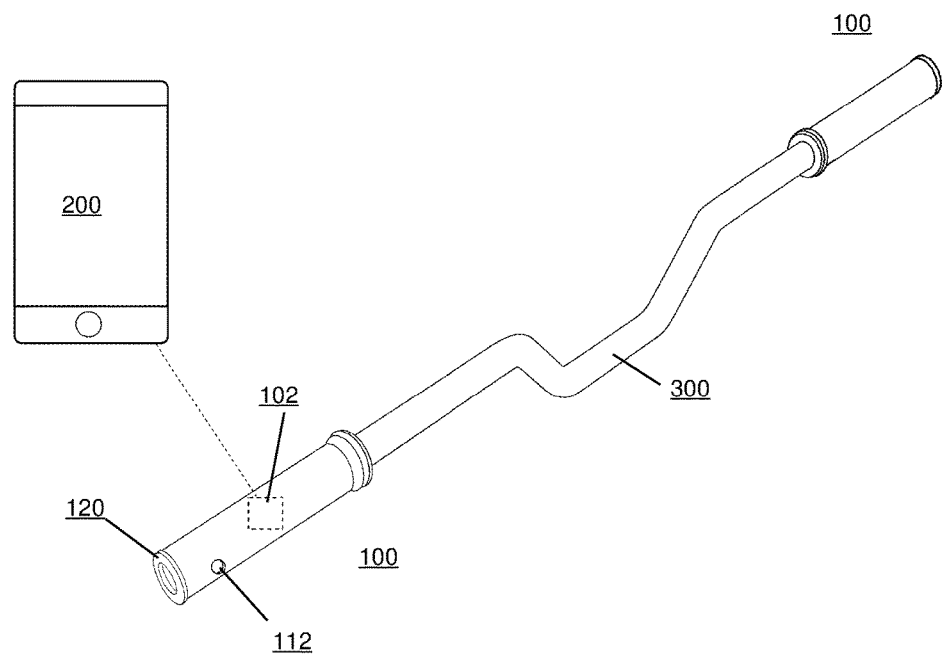
FIG. 2 illustrates an isometric view of the example handlebar apparatus installed on the steering beam of a bicycle and in wireless communication with a smartphone.

Referring to FIG. 2, the apparatus 100 is shown installed on either end of a bicycle steering handle 300, and in communication with the user device 200 which in this example is a smartphone.

Figure 3:
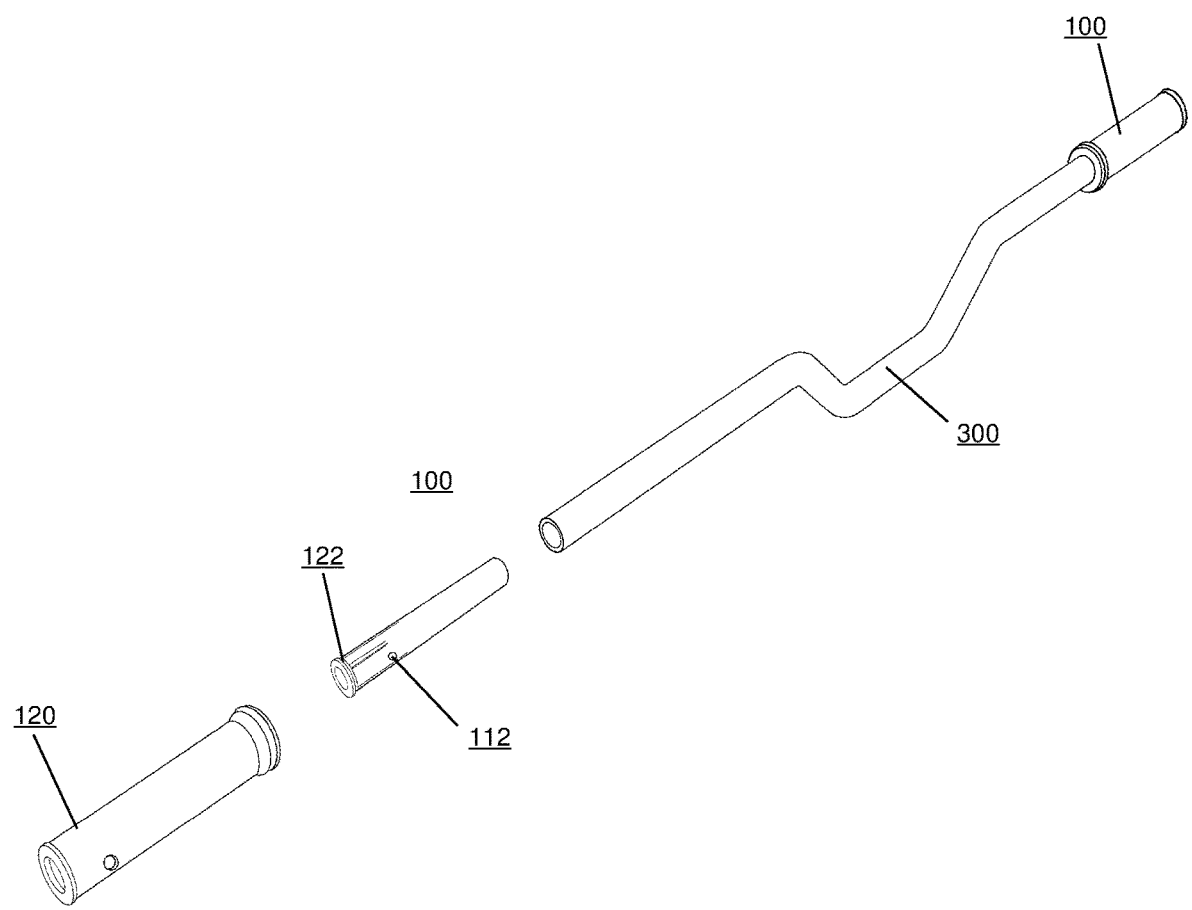
FIG. 3 illustrates an exploded view of the example handlebar apparatus with the exterior housing of the handlebar grip removed.

The apparatus 100 has a housing 120 which is configured to attach to the steering handle 300. This housing may directly connect to the shaft of the steering handle 300. As shown in the present example with reference to FIG. 3, the housing may comprise a detachable inner module 122 where the electrical components are installed. This allows the rechargeable power source to be recharged conveniently without carrying the entire handle grip about.

Figure 4:
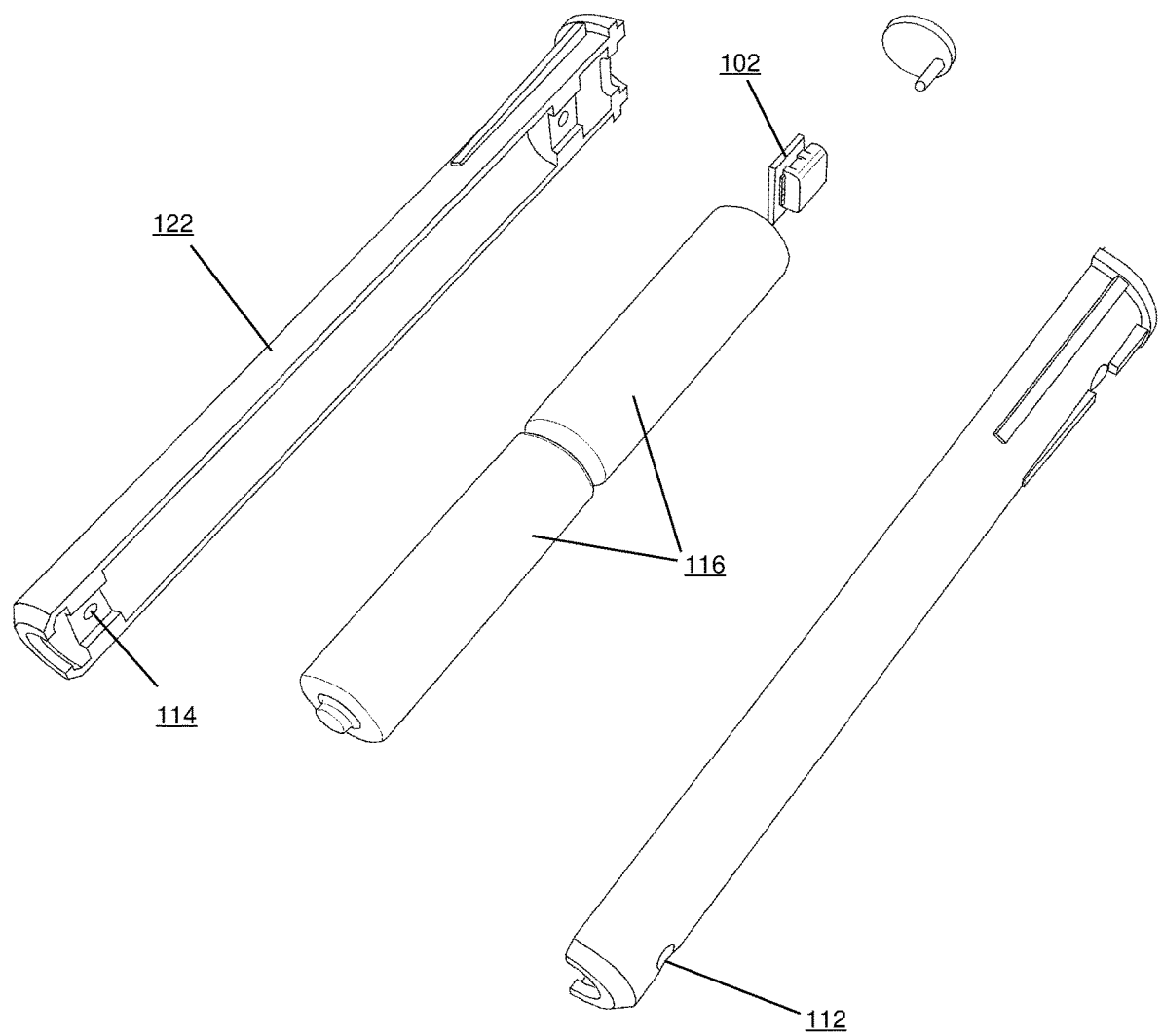
FIG. 4 illustrates an exploded components view of the example handlebar apparatus and its internal components.

Referring to FIG. 4, a components view of the inner module 12 is shown, with the rechargeable batteries 116 in between the two housing pieces 122 (which have openings for the front and rear lighting elements 112 and 114) and the microcontroller 102 positioned on a chip with a charging port. The wireless communications module may also be installed on the chip.

The microcontroller 102 is configured to receive positioning data from the GPS unit 106 indicative of the geographic location and movements of the apparatus 100 and transmit the positioning data to the external user device 200 via the wireless communication module 104 in real time. User device 200 may, for example, be a smartphone communicating with the controller 102 via Bluetooth, and may have an app installed thereon for interfacing with the apparatus 100.

With the app of the user device 200, the positioning data received from the apparatus can be used to calculate and track position history, average travel speed, distance travelled in a given period, elevation, and incline of travel for the apparatus, as well as various other metrics.

This can be extended to calculate a number of carbon credits or other currency units that a user has earned from cycling a certain distance. For example, the app may allow a user to enter an automotive vehicle type that they would otherwise be using if they were not cycling, and then calculate the amount of $CO_2$ not emitted by the user from that vehicle, due to travelling an equivalent distance on their bike.

In order to ensure that the user is actually cycling, the app may monitor the travel speed of the user. An accelerometer may also be incorporated into the apparatus 100 so that the distinctive motions of cycling can be used to prove that the user is not travelling by other means.

The recorded travel data for the user and their bicycle can also be used to generate health/risk profile data for the user. The more active they are on their bicycle, and the more intensely they are able to exercise, the less likely they are to succumb to cardiovascular disease etc. The data can be validated by the app and provided to health insurance providers for a more favourable rate.

The apparatus 100 can also incorporate multiple anti-theft security measures, such as allowing a user to set the speaker alarm through their phone, for example they may choose to cause the alarm to sound if the bike is moved during a designated time window, or outside of a designated area. The user may also be notified on their user device 200 if such conditions are met.

Upon installation of the apparatus 100, the app may be configured to provide an interface for a user to record their bicycle type and serial number. The software may in some cases further configured to validate the bicycle data by analysing a picture taken by the user of the bike and serial number, and to store the validated data on a blockchain.

The app may also incorporate social media features. For example, if the user's bike type is known, the app may have a feature for connecting with owners of the same bike type who are using the app, allowing them to interact and form a community.

The operations described above for the app may be implemented by one or more servers or computers over a wireless network which the user device are communicating through. Indeed, it should be understood that the operations described herein may be carried out by any suitable processor architecture.

In particular, the operations may be carried out by, but are not limited to, one or more computing environments used to implement the method such as a data center, a cloud computing environment, a dedicated hosting environment, and/or one or more other computing environments in which one or more assets used by the method re implemented; one or more computing systems or computing entities used to implement the method; one or more virtual assets used to implement the method; one or more supervisory or control systems, such as hypervisors, or other monitoring and management systems, used to monitor and control assets and/or components; one or more communications channels for sending and receiving data used to implement the method; one or more access control systems for limiting access to various components, such as firewalls and gateways; one or more traffic and/or routing systems used to direct, control, and/or buffer, data traffic to components, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the method; one or more databases used to store data; one or more internal or external services used to implement the method; one or more backend systems, such as backend servers or other hardware used to process data and implement the method; one or more software systems used to implement the method; and/or any other assets/components in which the method is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

As used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

Unless specifically stated otherwise, as would be apparent from the above discussion, it is appreciated that throughout the above description, discussions utilizing terms such as, but not limited to, "activating", "accessing", "adding", "applying", "analyzing", "associating", "calculating", "capturing", "classifying", "corn paring", "creating", "defining", "detecting", "determining", "eliminating", "extracting", "forwarding", "generating", "identifying", "implementing", "obtaining", "processing", "providing", "receiving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the apparatus have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A bicycle handlebar apparatus, comprising:
   a housing configured to couple to a bicycle handlebar;
   a power source disposed within the housing;
   a GPS unit disposed within the housing;
   a wireless communication module disposed within the housing; and
   a controller disposed within the housing, the controller being configured to:
     receive positioning data from the GPS unit indicative of the geographic location and movements of the apparatus; and
     transmit the positioning data to an external user device via the wireless communication module in real time;
   wherein the controller is configured to interface with and receive instructions from a dedicated application software of a user device;
   wherein the dedicated application software is configured to calculate and track, based on the received positioning data, one or more of: position history, average travel speed, distance travelled in a given period, elevation, and incline of travel for the apparatus;
   wherein the software is further configured to calculate a number of carbon credits or other currency units based on positioning data.

2. A bicycle handlebar apparatus according to claim 1, wherein the apparatus further comprises a front light element disposed on the housing exterior.

3. A bicycle handlebar apparatus according to claim 1, wherein the apparatus further comprises a rear light element disposed on the housing exterior.

4. A bicycle handlebar apparatus according to claim 1, wherein the apparatus further comprises a speaker disposed within the housing.

5. A bicycle handlebar apparatus according to claim 4, wherein the controller is further configured to sound the speaker alarm in response to one or more predefined alarm conditions.

6. A bicycle handlebar apparatus according to claim 1, wherein the apparatus further comprises a grip sensor disposed on the housing exterior and which is configured to measure the heartbeat of a user gripping the apparatus.

7. A bicycle handlebar apparatus according to claim 1, wherein the apparatus further comprises one or more physical controls for operating the controller functions.

8. A bicycle handlebar apparatus according to claim 1, wherein the dedicated application software is configured to issue a security alert notification to the user device when one or more predefined security conditions are met.

9. A bicycle handlebar apparatus according to claim 1, wherein the dedicated application software is configured to provide a map interface for viewing the position of the apparatus in real time.

10. A bicycle handlebar apparatus according to claim 1, wherein the software is further configured to provide an interface for selecting an automotive vehicle owned by a user from a list, and wherein the calculation of the number of carbon credits or other currency units is based on the amount of carbon emissions saved by travelling in a bicycle as opposed to the user's automotive vehicle.

11. A bicycle handlebar apparatus according to claim 1, wherein the software is further configured to determine a health risk profile of a user based on their positioning data history for insurance purposes.

12. A bicycle handlebar apparatus according to claim 1, wherein the dedicated application software is configured to record all positioning data in a database, each set of positioning data being associated with a user account in the database.

13. A bicycle handlebar apparatus according to claim 1, wherein the dedicated application software is configured to provide an interface for a user to record their bicycle type and serial number.

14. A bicycle handlebar apparatus according to claim 13, wherein the software is further configured to validate the bicycle data by analysing a picture, and to store the validated data on a blockchain.

15. A bicycle handlebar apparatus according to claim 13, wherein the software is further configured to provide an interface where users having bicycles of the same type may connect and interact via social media.

16. A bicycle handlebar apparatus according to claim 1, wherein the apparatus further comprises an accelerometer disposed within the housing.

17. A bicycle handlebar apparatus according to claim 16, wherein the controller is further configured to detect, based on the positioning data and the accelerometer readings, whether the apparatus is attached to a bicycle being ridden by a user.

* * * * *